June 17, 1958    R. E. KRATVILLE    2,839,741
INDICATOR LAMP TEST CIRCUIT
Filed Feb. 24, 1956

INVENTOR.
Robert E. Kratville
BY Owen & Owen
Attys.

United States Patent Office 2,839,741
Patented June 17, 1958

2,839,741

INDICATOR LAMP TEST CIRCUIT

Robert E. Kratville, Torrance, Calif., assignor to Theodore W. Hallerberg, Los Angeles, Calif.

Application February 24, 1956, Serial No. 567,534

2 Claims. (Cl. 340—213)

This invention relates to test circuits for a plurality of individual warning devices.

It has become conventional practice, in aircraft and the like, to provide a group of warning lights which are illuminated in response to some abnormality in a working part of the aircraft. Such lights, for example, warn against excessive temperatures at various points, low hydraulic pressures at critical parts of the system, and failure of electrical apparatus such as generators. In most cases, the warning light goes on only when the fault exists so that absence of the light means that conditions are within the normal range.

It is common practice to provide a test switch by the closure of which the operator can satisfy himself that the lamps are in normal condition and not burned out. In every instance with which I am familiar, however, the test switch is a part of the assembly of the warning light and individual thereto so that there are as many test switches as there are warning lights or circuits. Thus, if the warning light group comprises twenty individual lights there will be twenty test switches and each must be closed in turn if the entire system is to be checked. This is not only time consuming, but is a cumbersome practice.

It is of course, not possible to interconnect the several warning circuits by a single parallel test circuit, for the reason that false indications will be given unless each of the warning circuits is isolated from the others during use.

The present invention comprises means to connect a single test switch to a great multiplicity of warning circuits in such a way that closure of the single switch will cause all of the warning lamps to be lighted and tested and yet each warning circuit is isolated from the others when the test switch is open.

Other objects and advantages of the invention will become apparent from the following specification, reference being had to the accompanying drawings, in which—

Figure 1:
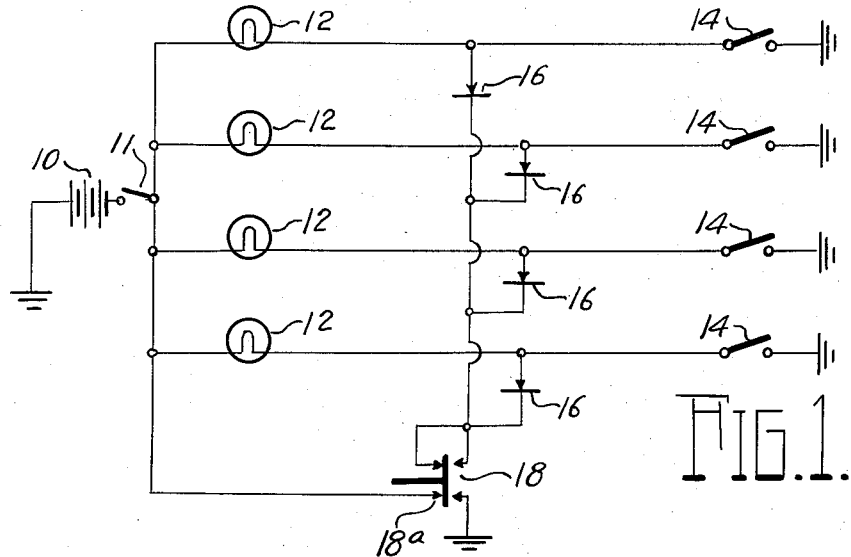
Figure 2:
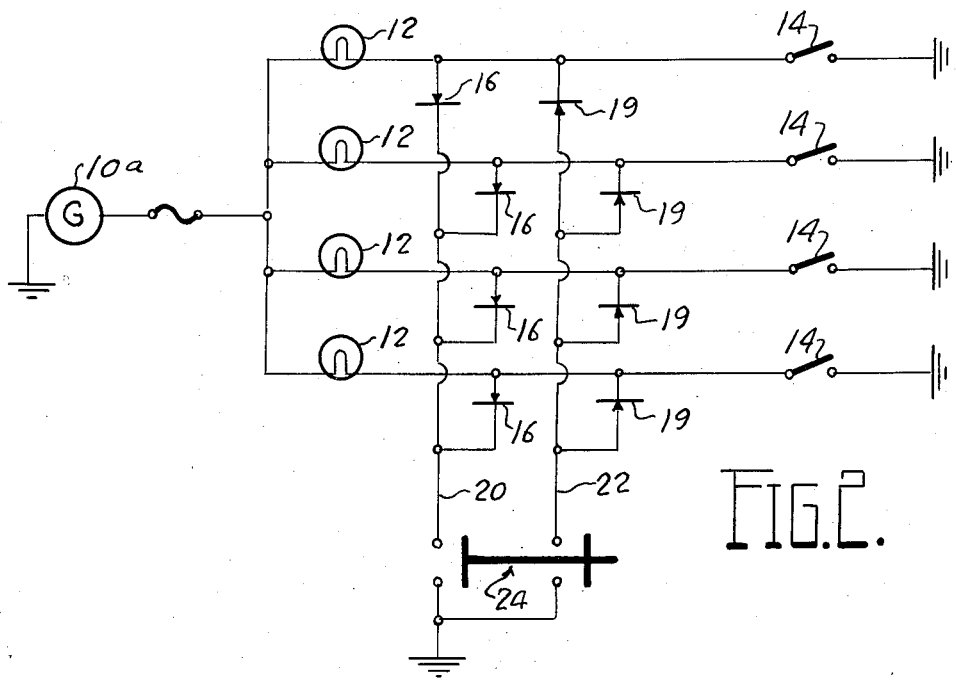

Fig. 1 is a schematic diagram of a circuit in which a direct current power source is used for a plurality of warning circuits; and Fig. 2 is a schematic diagram of a similar circuit in which an alternating current source is used.

Referring to the drawings, and particularly to Fig. 1, the bare essentials of a plurality of warning circuits are there shown as deriving energy from a single D. C. source 10 through a master switch 11. Each of the separate warning circuits comprises a lamp 12 in series with a fault switch 14 which is closed whenever a monitored condition is or becomes abnormal.

To test the lamps 12, the prior practice has been to provide a separate means to complete the circuit through each lamp individually, in parallel with the fault switch related thereto. It has also been suggested that a relay in each circuit might be used to complete the parallel test circuit and that all of the relays might be actuated from a single switch or push button. The present invention eliminates the expense and uncertainty of relays and retains the "single button" advantage.

In accordance with my invention each warning circuit is provided with a diode 16 connected to conduct away from the associated lamp and to block any current that might tend to flow to the lamp from other warning circuits. The diodes 16 are all tied to a common line leading to a test switch 18 which, when closed, completes a circuit through each of the lamps 12 and the respective diodes in series. Thus, when switch 18 is closed, all of the lamps 12 will be lighted except those that are burned out or otherwise defective and require replacement. When switch 18 is open, each of the separate warning circuits is isolated from all of the others. If the diodes were not present and one of the fault signal switches were closed, current could flow through all of the lamps in parallel and through the closed fault signal switch.

In some instances, where the operation of the system is from a direct current source, it is desirable to provide the double pole switch 18 with a pair of normally closed back contacts 18a which, when closed, connect the input of the diodes to the opposite polarity from that to which it is connected when switch 18 is depressed to the "test" position. Thus, should one of the diodes break down, a fail safe condition will exist and no possibility of a false indication will arise.

Since there are now available commercially diodes of very small size and of high reliability, the present invention lends itself to incorporation in a system of very small size and light weight.

Referring to the A. C. modification of the invention shown in Fig. 2, it will be seen that each warning lamp 12 is provided with a path to ground through a diode 16 and also through a diode 19 connected to conduct in the opposite direction. Each of the diodes 16 is connected to a common line 20 and each of the diodes 19 is connected to a common line 22. Lines 20 and 22 are connected to a double pole single throw switch 24 which, when closed, connects both lines to a return line to the power source designated 10a.

What I claim is:

1. In a warning system or the like comprising a power source, a plurality of parallel indicating circuits each connected to said power source and including a warning lamp in series with a condition-responsive fault switch, the improvement comprising a first group of unidirectional conductors connected to each indicating circuit in parallel with the fault switch therein, a second group of oppositely conducting uni-directional conductors connected to each indicating circuit in parallel with the fault switch therein and with said first group, and a single switch to complete a circuit through all of said uni-directional conductors and said warning lamps to test the lamps.

2. In a warning system or the like comprising a power source, a plurality of parallel indicating circuits each connected to said power source and including a warning lamp in series with a condition-responsive fault switch, the improvement comprising a test circuit for a plurality of said warning lamps including a diode connected between each of said warning lamps and its associated fault switch and conducting in the direction of or away from said lamps depending on circuit polarity, and a single switch connected between said power source and all of said diodes in parallel, whereby closure of a fault switch will cause only its associated warning lamp to be connected to said power source, the balance of said circuits being isolated by said diodes, and closure of said single switch will connect all of said plurality of lamps to said power source for test purposes.

(References on following page)

References Cited in the file of this patent

UNITED STATES PATENTS

| | | |
|---|---|---|
| 2,127,343 | Parlett | Aug. 16, 1938 |
| 2,355,149 | De Giers | Aug. 8, 1944 |
| 2,565,323 | Quinn | Aug. 21, 1951 |

FOREIGN PATENTS

| | | |
|---|---|---|
| 314,112 | Great Britain | June 24, 1929 |
| 499,900 | Great Britain | Jan. 31, 1939 |